(12) United States Patent  
Milman et al.

(10) Patent No.: US 11,333,794 B2  
(45) Date of Patent: May 17, 2022

(54) MULTIMEDIA DERIVED WIND MAP

(71) Applicant: INTERNATIONAL BUSINESS MACHINES CORPORATION, Armonk, NY (US)

(72) Inventors: Ivan M. Milman, Austin, TX (US); Sushain Pandit, Austin, TX (US); Charles D. Wolfson, Austin, TX (US); Su Liu, Austin, TX (US); Fang Wang, Westford, MA (US)

(73) Assignee: International Business Machines Corporation, Armonk, NY (US)

( * ) Notice: Subject to any disclaimer, the term of this patent is extended or adjusted under 35 U.S.C. 154(b) by 240 days.

(21) Appl. No.: 16/167,649

(22) Filed: Oct. 23, 2018

(65) Prior Publication Data

US 2020/0124767 A1 Apr. 23, 2020

(51) Int. Cl.
| | |
|---|---|
| *G01W 1/10* | (2006.01) |
| *G06F 16/29* | (2019.01) |
| *G06F 16/487* | (2019.01) |
| *G06F 16/22* | (2019.01) |

(52) U.S. Cl.
CPC .......... *G01W 1/10* (2013.01); *G06F 16/2228* (2019.01); *G06F 16/29* (2019.01); *G06F 16/487* (2019.01)

(58) Field of Classification Search
CPC ........ G01W 1/10; G06F 16/29; G06F 16/487; G06F 16/2228
See application file for complete search history.

(56) References Cited

U.S. PATENT DOCUMENTS

| | | | | |
|---|---|---|---|---|
| 9,465,987 | B1* | 10/2016 | Bell | G06K 9/00798 |
| 9,571,971 | B2 | 2/2017 | Lection et al. | |
| 2009/0154771 | A1* | 6/2009 | Cichiello | G06T 7/20 |
| | | | | 382/107 |
| 2010/0104187 | A1 | 4/2010 | Broadbent | |
| 2013/0250731 | A1 | 9/2013 | You | |
| 2014/0280569 | A1* | 9/2014 | Harris | H04W 4/185 |
| | | | | 709/204 |

(Continued)

FOREIGN PATENT DOCUMENTS

| | | | | |
|---|---|---|---|---|
| CN | 102023231 | A | * | 4/2011 |
| CN | 104569486 | A | * | 4/2015 |
| JP | 2016133433 | A | * | 7/2016 |

OTHER PUBLICATIONS

Keeling "A Greate Day For DIY Wind Speed Measuring", Aug. 2016, pp. 1-2 (Year: 2016).*

(Continued)

*Primary Examiner* — Eyob Hagos  
(74) *Attorney, Agent, or Firm* — Kristofer L. Haggerty

(57) ABSTRACT

Embodiments of the present invention disclose a method, a computer program product, and a computer system for generating a wind map based on multimedia analysis. A computer receives a multimedia source configuration and builds a wind scale reference database. In addition, the computer extracts and processes both wind speed data and contextual data from the multimedia. Moreover, the computer analyses temporal and spatial features, as well as generates a wind map based on the extracted context, extracted wind speed, and analysed temporal and spatial features. Lastly, the wind map generator validates and modifies the wind scale reference database.

11 Claims, 6 Drawing Sheets

(56) References Cited

U.S. PATENT DOCUMENTS

| | | | |
|---|---|---|---|
| 2014/0372360 A1 | 12/2014 | Asrani | |
| 2015/0254910 A1* | 9/2015 | Summers | B63B 49/00 |
| | | | 701/31.5 |
| 2017/0127220 A1 | 5/2017 | Rosti et al. | |
| 2017/0262697 A1* | 9/2017 | Kaps | G11B 27/022 |
| 2018/0285340 A1* | 10/2018 | Murphy | G06F 40/295 |
| 2018/0313975 A1* | 11/2018 | Chen | G06F 16/5866 |

OTHER PUBLICATIONS

Hsu "Mesoscale Lake-effect Snowstorms in the Vicinity of Lake Michigan: Linear Theory and Numerical Simulations", National Center for Atmospheric Research, Apr. 1987, p. 1019 (Year: 1987).*
Keeling,"A Great Day For DIY Wind Speed Measuring", Aug. 20, 2016, p. 1 (Year: 2016).*
Wikipedia, "Wind", https://en.wikipedia.org/wiki/Wind, printed May 2, 2018, pp. 1-22.
Kaplan, "The Weather Company's Jeremy Steinberg On the Ways Location Data Should Direct Marketer's Decisions", http://www.geomarketing.com/the-weather-companys-jeremy-steinberg-o . . . Mar. 2, 2016, pp. 1-9.
Wikipedia, "Planetary Boundary Layer", https://en.wikipedia.org/wiki/Planetary_boundary_layer, printed May 2, 2018, pp. 1-5.
https://opensignal.com/reports/battery-temperature-weather/, "Mobile meteorology: smartphone batteries will change the way we measu . . . ", printed May 2, 2018, pp. 1-13.
Klein, "How to Use Your Phone as a Barometer or Altimeter", https://www.howtogeek.com/254603/how-to-use-your-phone-as-a-barom . . . , Jun. 24, 2016, pp. 1-7.
http://www.spc.noaa.gov/faq/tornado/beaufort.html, "Beaufort Wind Scale", printed May 2, 2018, pp. 1-2.
https://public.wmo.int/en, "World Meteorological Organization", printed May 2, 2018, pp. 1-3.
Wikipedia, "Apparent Temperature", https://en.wikipedia.org/wiki/Apparent_temperature, printed May 2, 2018, p. 1.
Mikipedia, "Wind Chill", https://en.wikipedia.org/wiki/Wind_chill, printed May 2, 2018, pp. 1-5.
Engber, "Wind Chill Blows", It's time to get rid of a meaningless number, http://www.slate.com/articles/health_and_science/science/2007/02/wind_ . . . , Feb. 9, 2007, pp. 1-5.
IBM, "IBM Cloud, Build and Run Apps and Services with a Flexible, hybrid cloud", https://www.ibm.com/us-en/marketplace, pp. 1-5.
Wikipedia, "Beaufort Scale", https://en.wikipedia.org/wiki/Beaufort_scale, printed May 2, 2018, pp. 1-5.
Keeling, "A Great Day for DIY Wind Speed Measuring", http://premium.weatherweb.net/2016/08/20/a-gr, Aug. 20, 2016, pp. 1-3.
Benac, "How to Calculate Wind Speed Angle Using a Flag", https://healthfully.com/calculate-speed-angle-using-flag-5856494.html, printed May 2, 2018, pp. 1-2.
Mr.Siderer's Weblog, "Estimating Wind Speed With Only A Flag", https://mrsiderer.wordpress.com/2013/02/26/estimating-wind-speed-with-only-a-flag/, printed May 2, 2018, pp. 1-3.
Maharani et al., "Topographical Effects on Wind Speed over Various Terrains: A Case Study for Korean Peninsula", The Seventh Asia-Pacific Conference on Wind Engineering, Nov. 8-12, 2009, Taipei, Taiwan, pp. 1-11.
Ruel et al., "Effect of Topography on Wind Behaviour in a Complex Terrain", https://academic.oup.com/forestry/article-abstract/71/3/261/5, Institue of Chartered Foresters, 199H, Foresty, vol. 71, No. 3, 1998, pp. 1-5.
Parkinson, "The Problem with the Skyscraper Wind Effect", BBC News Magazine, Jul. 9, 2015, pp. 1-19.
Martin, Cities Change Wind Patterns, Raising Pollution, http://www.earthtimes.org/pollution/cities-change-wind-patters-raising- . . . , printed May 2, 2018, pp. 1-4.
Wikipedia, "Heat Index", https://en.wikipedia.org/wiki/Heat_index, printed May 2, 2018, pp. 1-4.
Mell et al., "The NIST Definition of Cloud Computing", National Institute of Standards and Technology, Special Publication 800-145, Sep. 2011, pp. 1-7.
IBM, "IBM Case Manager", Simplifies complex case workflow and empowers case workers, https://www.ibm.com/us-en/marketplace/case-manager, printed Oct. 23, 2018, p. 1.

* cited by examiner

| Wind Scale # | Wind Speed km/h | Wind Speed mph | Wind Speed kts | Wind Speed m/s | Wind Description | Wave Height m | Wave Height ft | Sea Observations | Land Observations |
|---|---|---|---|---|---|---|---|---|---|
| 0 | <1 | <1 | <1 | <0.3 | Calm, Windless, No Wind | 0 | 0 | Flat | Calm. Smoke rises vertically. |
| 1 | 1-5 | 1-3 | 1-2 | 0.3-1.5 | Light Air | 0.1 | 0.33 | Ripples without crests. | Wind motion visible in smoke. |
| 2 | 6-11 | 3-7 | 3-6 | 1.5-3.3 | Light Breeze | 0.2 | 0.66 | Small wavelets. Crests of glassy appearance, not breaking. | Wind felt on exposed skin. Leaves rustle. |
| 3 | 12-19 | 8-12 | 7-10 | 3.3-5.5 | Gentle Breeze | 0.6 | 2 | Large wavelets. Crests begin to break, scattered whitecaps. | Leaves and smaller twigs in constant motion. |
| 4 | 20-28 | 13-17 | 11-15 | 5.5-8 | Moderate Breeze | 1 | 3.3 | Small waves. | Dust and loose paper raised. Small branches begin to move. |
| 5 | 29-38 | 18-24 | 16-20 | 8-10.8 | Fresh Breeze | 2 | 6.6 | Moderate (1.2m) longer waves. Some foam and spray. | Branches of a moderate size move. Small trees begin to sway. |
| 6 | 39-49 | 25-30 | 21-26 | 10.8-13.9 | Strong Breeze, Cannot Stand Upright, Blowing Hats Off | 3 | 9.9 | Large waves with foam crests and some spray. | Large branches in motion. Whistling heard in overhead wires. Umbrella use becomes difficult. Empty plastic garbage cans tip over. |
| 7 | 50-61 | 31-38 | 27-33 | 13.9-17.2 | High Wind, Moderate Gale, Near Gale, Breaking Umbrellas | 4 | 13.1 | Sea heaps up and foam begins to streak. | Whole trees in motion. Effort needed to walk against the wind. Swaying of skyscrapers may be felt, especially by people on upper floors. |
| 8 | 62-74 | 39-46 | 34-40 | 17.2-20.7 | Fresh Gale | 5.5 | 18 | Moderately high waves with breaking crests forming spindrift. Streaks of foam. | Twigs broken from trees. Cars veer on road. |
| 9 | 75-88 | 47-54 | 41-47 | 20.7-24.5 | Strong Gale | 7 | 23 | High waves (6-7m) with dense foam. Wave crests start to roll over. Considerable spray. | Larger branches break off trees, and some small trees blow over. Construction/temporary signs and barricades blow over. Damage to circus tents and canopies. |
| 10 | 89-102 | 55-63 | 48-55 | 24.5-28.4 | Whole Gale/Storm, Raining Sideways | 9 | 29.5 | Very high waves. Large patches of foam from wave crests give the sea a white appearance. Considerable tumbling of waves with heavy impact. Large amounts of airborne spray reduce visibility. | Trees are broken off or uprooted, saplings bent and deformed, poorly attached asphalt shingles and shingles in poor condition peel off roofs. |
| 11 | 103-117 | 64-72 | 56-63 | 28.4-32.6 | Violent Storm | 11.5 | 37.7 | Exceptionally high waves. Very large patches of foam, driven before the wind, cover much of the sea surface. Very large amounts of airborne spray severely reduce visibility. | Widespread vegetation damage. More damage to most roofing surfaces, asphalt tiles that have curled up and/or fractured due to age may break away completely. |
| 12 | ≥118 | ≥73 | ≥64 | ≥32.6 | Hurricane Force | ≥14 | ≥46 | Huge waves. Sea is completely white with foam and spray. Air is filled with driving spray, greatly reducing visibility. | Considerable and widespread damage to vegetation, a few windows broken, structural damage to mobile homes and poorly constructed sheds and barns. Debris may be hurled about. |

Figure 3

MULTIMEDIA DERIVED WIND MAP

BACKGROUND

The present invention relates generally to wind mapping, and more particularly to wind mapping using multimedia data.

Wind is moving air caused by a difference in air pressure within the atmosphere. Near-surface wind data is closely related to the everyday business life, for example at wind energy farms and airports, as well as personal life, for example sailing and flying a kite. For these reasons, wind is closely monitored, however, variables in the atmospheric boundary layer are complex. Wind is particularly complex due to being transient, heterogeneous, and greatly impacted by the complex surface features, such as terrain elevation and bodies of water. While wind data collection has traditionally relied on measurements from wind towers, anemometers, weather vanes, weather balloons, remote sensing techniques, and the like, these measurements are sparse and the instruments are expensive to both purchase and maintain.

SUMMARY

Embodiments of the present invention disclose a method, a computer program product, and a computer system for generating a wind map based on multimedia analysis. In embodiments herein, the present invention discloses deducing a wind speed of wind identified in one or more multimedia based on a wind scale reference database, extracting contextual data corresponding to the one or more multimedia, and generating a wind map based on the deduced wind speed and extracted contextual data.

According to some embodiments, extracting the contextual data corresponding to the one or more multimedia further comprises extracting a geolocation wherein the one or more multimedia was recorded, extracting a date and a time at which the one or more multimedia was recorded, and extracting an elevation of the wind recorded in the one or more multimedia.

In accordance with some embodiments, the present invention further comprises retrieving a verified wind speed from a weather station within a threshold spatial proximity and a threshold temporal proximity to the extracted geolocation, comparing the verified wind speed to the deduced wind speed, and modifying the wind scale reference database based on the comparison.

Moreover, some embodiments may further comprise removing false positive multimedia from the one or more multimedia by applying natural language processing to the extracted contextual data.

According to an embodiment of the present invention, the one or more multimedia includes at least one of text, audio, image, and video. In addition, extracting the contextual data corresponding to the one or more multimedia further comprises transcribing the audio, applying keyword searching and natural language processing to the transcribed audio and the text, and applying image recognition technology to the image and the video.

In various embodiments, the present invention may further comprise extracting temporal and spatial features from the multimedia, wherein the temporal and spatial features include terrain and topographic wind, building winds, city winds, heat island effects, lake effects, and mountain waves. Moreover, deducing the wind speed of the wind is further based on the extracted temporal and spatial features.

According to some embodiments, extracting the contextual data corresponding to the one or more multimedia further comprises extracting a wind direction from the one or more multimedia, extracting an atmospheric pressure from the one or more multimedia, and extracting a temperature from the one or more multimedia.

BRIEF DESCRIPTION OF THE SEVERAL VIEWS OF THE DRAWINGS

The following detailed description, given by way of example and not intended to limit the invention solely thereto, will best be appreciated in conjunction with the accompanying drawings, in which:

FIG. 3 depicts the wind scale reference database 122 of FIG. 1 as a modified Beaufort Scale, in accordance with an embodiment of the present invention.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION OF THE SEVERAL VIEWS OF THE DRAWINGS

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete, and will fully convey the scope of this invention to those skilled in the art. In the description, details of well-known features and techniques may be omitted to avoid unnecessarily obscuring the presented embodiments.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In the interest of not obscuring the presentation of embodiments of the present invention, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is focused on the distinctive features or elements of various embodiments of the present invention.

Figure 1:
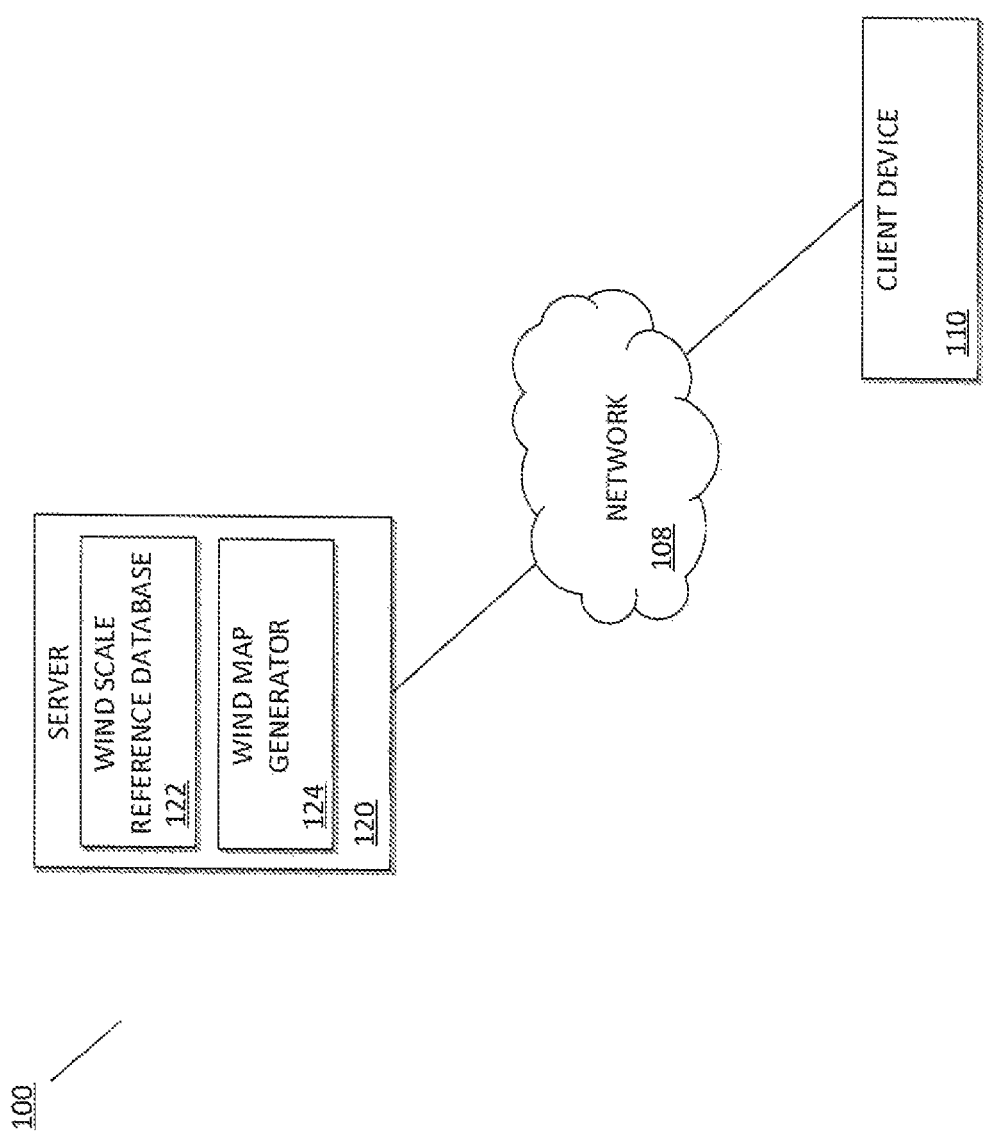
FIG. 1 depicts a schematic diagram of a wind map generating system 100, in accordance with an embodiment of the present invention.

FIG. 1 depicts a wind map generating system 100, in accordance with embodiments of the present invention. In the example embodiment, wind map generating system 100 includes a client device 110 and a server 120, interconnected via a network 108. While, in the example embodiment, programming and data of the present invention are stored and accessed remotely across several servers via the network 108, in other embodiments, programming and data of the present invention may be stored locally on as few as one physical computing device or amongst other computing devices than those depicted.

In the example embodiment, the network 108 is a communication channel capable of transferring data between connected devices. In the example embodiment, the network 108 is the Internet, representing a worldwide collection of networks and gateways to support communications between devices connected to the Internet. Moreover, the network 108 may include, for example, wired, wireless, and/or fiber optic connections which may be implemented as an intranet network, a local area network (LAN), a wide area network (WAN), or a combination thereof. In further embodiments, the network 108 may be a Bluetooth network, a WiFi network, or a combination thereof. In yet further embodiments, the network 108 may be a telecommunications network used to facilitate telephone calls between two or more parties comprising a landline network, a wireless network, a closed network, a satellite network, or a combination thereof. In general, the network 108 can be any combination of connections and protocols that will support communications between connected devices.

In the example embodiment, the client device 110 may be an enterprise server, a laptop computer, a notebook, a tablet computer, a netbook computer, a personal computer (PC), a desktop computer, a server, a personal digital assistant (PDA), a rotary phone, a touchtone phone, a smart phone, a mobile phone, a virtual device, a thin client, or any other electronic device or computing system capable of receiving and sending data to and from other computing devices. While the client device 110 is shown as a single device, in other embodiments, the client device 110 may be comprised of a cluster or plurality of computing devices, working together or working separately. Similarly, while FIG. 1 illustrates only one instance of the client device 110 in the interest of brevity, in other embodiments, any number of instances of the client device 110 may be implemented within the wind map generating system 100. In the example embodiment, the client device 110 includes an accelerometer, a gyroscope, a barometer, an altimeter, a means for connecting to a global positioning system (GPS), and other integrated sensors for collecting information regarding an environment. The client device 110 is described in greater detail with reference to FIG. 4.

In the example embodiment, the server 120 includes a wind scale reference database 122 as well as a wind map generator 124, and may be an enterprise server, a laptop computer, a notebook, a tablet computer, a netbook computer, a personal computer (PC), a desktop computer, a server, a personal digital assistant (PDA), a rotary phone, a touchtone phone, a smart phone, a mobile phone, a virtual device, a thin client, or any other electronic device or computing system capable of receiving and sending data to and from other devices. While the server 120 is shown as a single device, in other embodiments, the server 120 may be comprised of a cluster or plurality of computing devices, working together or working separately. The server 120 is described in greater detail with reference to FIG. 4.

In the example embodiment, the wind scale reference database 122 is a relational database used for relating wind scale and speed to observable atmospheric events and other phenomena. More specifically, the wind scale reference database 122 correlates a wind scale and corresponding wind speed with descriptions of phenomena found in multimedia. Accordingly, the wind scale reference database 122 is populated with keywords, descriptions, target objects, phenomena, and other indicators of wind found within multimedia that are associated with a particular wind scale and wind speed. The wind scale reference database 122, in accordance with an embodiment of the present invention, is depicted by FIG. 3 and described in greater detail with reference to FIG. 2.

The wind map generator 124 is a software program capable of receiving a multimedia source configuration and building a wind scale reference database. In addition, the wind map generator 124 is capable of extracting and processing both wind speed data and contextual data from the multimedia. Moreover, the wind map generator 124 is capable of analysing temporal and spatial features, as well as generating a wind map based on the extracted context, extracted wind speed, and analysed temporal and spatial features. Lastly, the wind map generator 124 is capable of validating and modifying the wind scale reference database.

Figure 2:
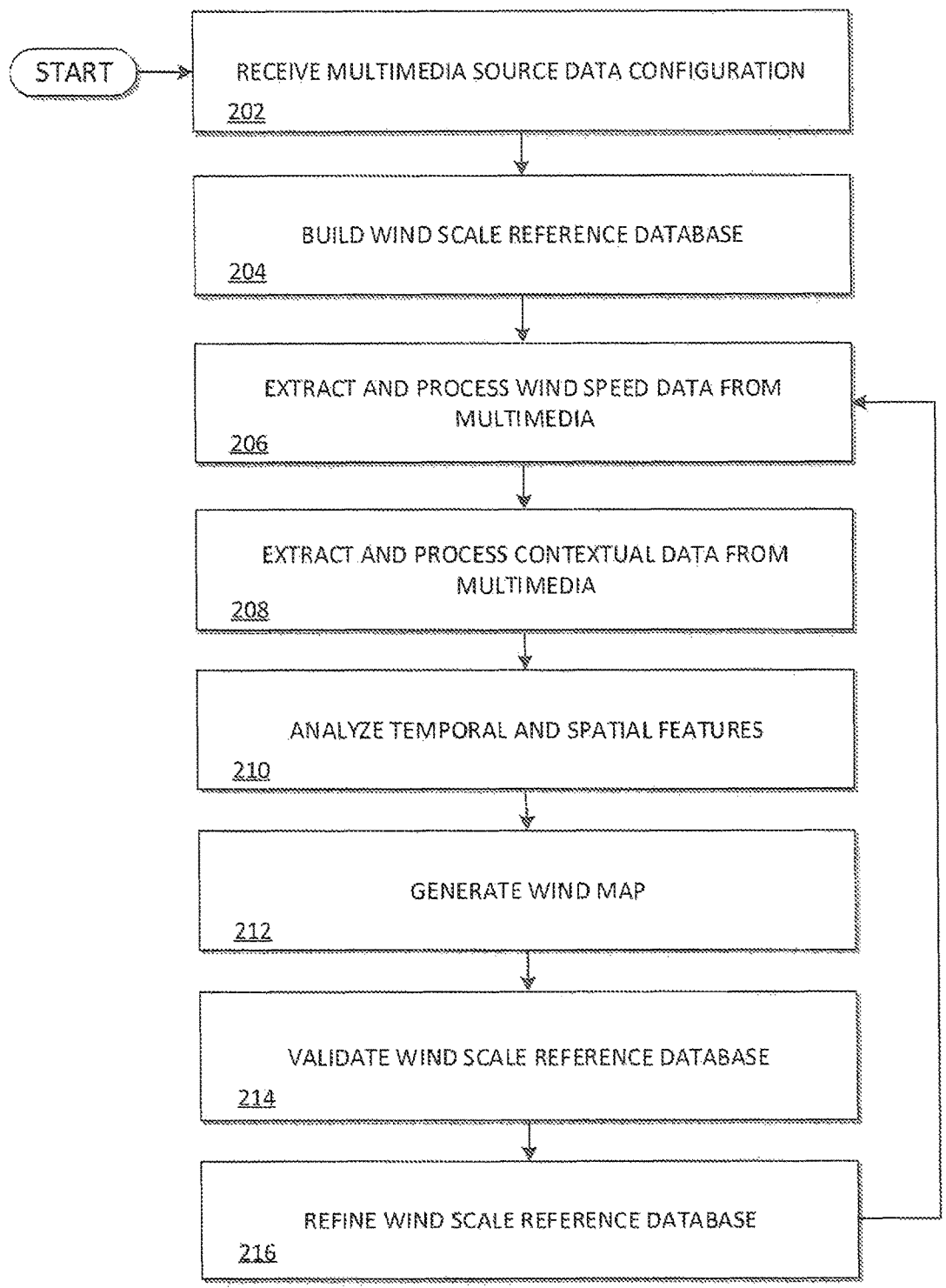
FIG. 2 depicts a flowchart illustrating the operations of a wind map generator 124 of the wind map generating system 100 in deriving a wind map via multi-source analysis.

FIG. 2 illustrates the operations of the wind map generator 124 of the wind map generating system 100 in generating a wind map through multimedia analysis.

The wind map generator 124 receives a source data configuration (step 202). In the example embodiment, the wind map generator 124 is configured to monitor various sources from which data relating to wind speed may be extracted and processed in order to ultimately derive a wind speed. Accordingly, the wind map generator 124 is configured to crawl structured and unstructured multimedia, e.g., text, audio, images, video, etc., of preconfigured sources such as websites, databases, applications, and other digital media for particular keywords, expressions, reference objects, events/phenomena, and other features indicative of a current wind speed. Such sources may include, for example, social collaboration websites, messaging platforms, digital media sharing platforms, personal/professional networking platforms, digital libraries, multimedia repositories, news and entertainment multimedia, sports multimedia, etc.

To further illustrate the operations of the wind map generator 124, reference is now made to an illustrative example where the wind map generator 124 is configured to search a social media platform, a messaging application, and an image sharing application for various forms of multimedia.

The wind map generator 124 builds the wind scale reference database 122 (step 204). In the example embodiment, the wind scale reference database 122 is a relational database used for relating wind scale and speed to observable atmospheric events and other phenomena. More specifically, the wind map generator 124 determines a wind scale and corresponding wind speed by comparing phenomena observed in various multimedia sources with descriptions and keywords of phenomena detailed by the wind scale reference database 122. Accordingly, the wind scale reference database 122 is populated with keywords, descriptions, target objects, phenomena, and other indicators of wind found within multimedia that are associated with a particular wind scale and wind speed. An example wind scale reference database 122 is illustrated in FIG. 3 where Wind Scale and Wind Speed are correlated with various, observable atmospheric conditions, namely a Wind Description, a Wave Height at sea, one or more Sea Observations, and one or more Land Observations. For example, and with reference to FIG. 3, observing "ripples without crests" at sea is an indicator of a Wind Scale of 1 and wind speeds of 1-3 mph (1-5 km/h). In the example embodiment, such wind scales may be custom made and/or based on existing and known wind scales, such as the Beaufort Wind Scale and scales offered by the World Meteorological Organization (WMO) Commission for Instruments and Methods of Observation (CIMO). Moreover, the wind scales and wind scale reference database may be continuously modified and improved through use of a feedback loop, described in greater detail below.

Referring now to the previously introduced illustrative example, the wind map generator 124 builds the wind scale reference database relating wind speed and scale to observable atmospheric conditions depicted by FIG. 3. Here, the wind scale reference database 122 correlates a wind scale and speed to various observable phenomena on land and at sea.

The wind map generator 124 extracts and processes wind speed data from the source multimedia (step 206). In the example embodiment, the wind map generator 124 identifies multimedia having an indication of wind and deduces a corresponding wind scale by searching multimedia sources for observables detailed by the wind scale reference database 122, for example those listed under the columns entitled Wave Height, Sea Observations, and Land Observations (FIG. 3). The wind map generator 124 identifies such observables by searching the multimedia for keywords and target objects that are described by the wind scale reference database 122, then uses a matching algorithm to determine an appropriate wind scale value. For example, and with reference to FIG. 3, the wind map generator 124 may be configured to associate audio or text mentioning "flat" or "calm" as they relate to waves with a wind scale of 0. In addition, and again with reference to FIG. 3, the wind map generator 124 may be configured to associate an image/video of smoke rising vertically with a wind scale of 0.

In the example embodiment (step 206 continued), the wind map generator 124 may be configured to search the multimedia for all observables within the wind scale reference database 122 and determine an appropriate wind scale using various matching algorithm techniques. In embodiments where observables from multiple wind scales are extracted, for example, the wind map generator 124 may default to the highest wind scale having observables or the wind scale having the most observables identified in multimedia. In an example illustrating the former, if the wind map generator 124 identifies two observables corresponding to a wind scale of 3 and one observable corresponding to a wind scale of 4, then the wind map generator 124 defaults to the wind scale of 4. Alternatively, and exemplifying the latter situation, if the wind map generator 124 identifies two observables corresponding to a wind scale of 4 and one observable corresponding to a wind scale of 5, then the wind map generator 124 defaults to the wind scale of 5. In other embodiments, the wind map generator 124 may be configured to weight particular observables based on a feedback loop (described in greater detail below) and average a weighted score of the observables for each wind scale before defaulting to the greatest weighted score. In yet further embodiments, the wind map generator 124 may be configured to average wind scales when multiple wind scales are involved using subscales, for example a scale of 3.5 in the aforementioned example.

It is important to note that wind is transient and variable, and moreover the present application cannot dictate when the multimedia from which it deduces a wind speed is captured. Thus, in order to account for changes over time, such observations may be broken down or consolidated based on threshold time blocks, for example, by the second, minute, hour, or day. For example, wind speeds deduced from three different multimedia recorded at a similar time and place may be averaged over one minute to provide a single, averaged wind speed. The rate at which deduced wind speeds are averaged may be varied by geographic location, time, availability, multimedia supply, and other variables. For example, the rates at which deduced times are averaged may be more frequent in a city, where multimedia is frequently captured, than in a rural town with less residents and less captured multimedia.

Similarly, the present invention cannot dictate where multimedia is captured and, like above, may break down or consolidate observations based on a threshold radius. For example, wind speeds deduced within a specific distance of each other may be averaged such that the wind map generator 124 provides a single, average wind speed for the entire area. The threshold distance at which deduced wind speeds are averaged may be varied by geographic location, time, availability, multimedia supply, and other variables. For example, the distances at which deduced speeds are averaged may be lesser and more granular in a city, where multimedia is frequently captured, than in a rural town with less residents and less captured multimedia.

The wind map generator 124 extracts and processes contextual data from the source multimedia (step 208). Having extracted a deduced wind speed, the wind map generator 124 now extracts contextual information with which to associate with the deduced wind speed. In the example embodiment, the wind map generator 124 utilizes the contextual data in order to pinpoint a place, date/time, elevation of the wind, wind direction, pressure, temperature, and other contextual information regarding each deduced wind speed in order to generate a comprehensive wind map. Accordingly, the wind map generator 124 extracts and processes contextual data that includes data relating to a geolocation at which the multimedia was recorded, a date/time at which the multimedia was recorded, wind elevation, wind direction, atmospheric pressure, temperature, and other contextual data relevant to the wind map. In order to extract the contextual data, the wind map generator 124 analyses structured data associated with the multimedia, for example metadata such as timestamps, hashtags, geotags, as well as unstructured data associated with the multimedia, for example natural language speech and objects/phenomena depicted by the multimedia. The following paragraphs describe how the wind map generator 124 extracts and processes the contextual data from various multimedia.

In order to extract a geolocation at which the multimedia was recorded (step 208 continued), the wind map generator 124 analyses a geotag associated with metadata of the source multimedia. In the example above, for instance, the wind map generator 124 inspects metadata associated with an image on the image sharing platform to identify a geotag indicating that the image was taken in New York City (NYC). In further embodiments, the wind map generator 124 may extract a geolocation by applying image recognition and optical character recognition techniques to images and videos in order to identify particular objects, natural formations, landmarks, buildings, restaurants, license plates, street signs, text, and the like. As such, the wind map generator 124 may be configured to recognize location-based objects and indicators such as snow or currency, natural formations such as the Grand Canyon and Niagara Falls, landmarks such as statues, parks, and buildings, and text such as that depicted on buildings, menus, and street signs. Again, with reference to the illustrative example, the wind map generator 124 is configured to identify a geolocation of NYC based on identifying the Empire State Building in the foreground of a captured video. When applicable, the wind map generator 124 may be further configured to cross reference the extracted objects, natural formations, landmarks, and text with various online resources to determine/verify a precise location where the multimedia was captured. For example, the wind map generator 124 may identify the precise location of a particular restaurant, park, or street corner mentioned within/depicted by the multimedia by searching for it within an online reference database or map.

In yet further embodiments (step 208 continued), the wind map generator 124 may be configured to extract a geolocation by implementing keyword searches in conjunction with natural language processing to text and audio transcribed to text. For example, the wind map generator 124 may transcribe recorded conversations and search them for particular keywords such as restaurants, parks, streets, and cities. In the illustrative example above, for instance, the wind map generator 124 may extract a geolocation based on identifying the keywords "5$^{th}$ and Madison" within a video recording. Moreover, upon identification of a keyword, the wind map generator 124 may be configured to apply natural language processing techniques to the text in order to filter out false positives, such as hypothetical plans to visit a location or previous/future trips to the location. With reference again to the earlier introduced example, the wind map generator 124 applies natural language processing to filter a false positive mention of NYC wherein the multimedia text reads "I hear the wind makes it feel very cold in New York City during the winter" because the reference to wind in NYC was with regard to the winter, and not current wind context.

In addition (step 208 continued), the wind map generator 124 extracts and processes a date and time at which the multimedia was recorded. Similar to the manner in which the wind map generator 124 extracts a geotag from multimedia, the wind map generator 124 extracts a date/time at which the multimedia was recorded by analysing a timestamp associated with metadata corresponding to the multimedia. As applied to the illustrative example, for instance, the wind map generator 124 extracts a timestamp from metadata of an image depicting a flag waving in the wind. In further embodiments, the wind map generator 124 may extract a time of capture by applying image recognition and optical character recognition techniques to images/videos in order to identify particular objects, phenomena, and text depicted by the multimedia. For example, the wind map generator 124 may be configured to recognize time-based objects such as a clock or watch, phenomena such as a sunrise, noon, or sunset, and text such as that depicted on street signs, buildings, and menus. In the previously introduced example, for instance, the wind map generator 124 extracts a time of capture from an image depicting a train schedule having a digital clock. In addition, the wind map generator 124 may extract a time of capture from a picture depicting the sun setting over a horizon.

When applicable (step 208 continued), the wind map generator 124 may be further configured to cross reference the extracted objects, phenomena, and text with various online sources and other contextual data to determine/verify a precise time at which the multimedia was captured. For example, the wind map generator 124 may search a website for dinner hours of a restaurant depicted in a dinner photo, or times of a sporting event depicted in the background of a photo. With reference to the previous example having multimedia depicting a setting sun, the wind map generator 124 may extract a time of capture by cross referencing a sunset time for that particular geolocation. In yet further embodiments, the wind map generator 124 may be configured to extract a time of capture by implementing keyword searches in conjunction with natural language processing to text and audio transcribed to text. For example, the wind map generator 124 may transcribe recorded conversations and search them for particular keywords corresponding to time, such as references to seconds/minutes/hours, appointments, and time-relevant events such as breakfast, lunch, and happy hour. In the example above, for instance, the wind map generator 124 extracts a time mentioned in a recorded video.

In embodiments (step 208 continued), and upon detection of a particular keyword, the wind map generator 124 may additionally apply natural language processing techniques to the text in order to filter out false positives, such as hypothetical plans for a particular time and/or previous/future references to time. For instance, the wind map generator 124 may filter out video based on determining that a mention to time was with reference to a future business meeting and not the time of recording. In yet further embodiments, the wind map generator 124 may extract times from audio recordings that include events such as church/bell tower ringing at prescribed times and/or transportation announcements at bus stations, train stations, and airports. In the example above, for instance, if a multimedia is recorded in Grand Central Train Station and an announcement over a loud speaker indicates a scheduled train is boarding, the wind map generator 124 identifies the scheduled train departure time.

Furthermore (step 208 continued), the wind map generator 124 processes and extracts data relating to an elevation of wind identified within the multimedia. In the example embodiment, the wind map generator 124 is configured to appreciate that wind speed is subject to elevation and surface obstruction, and therefore estimates an elevation of wind based on one or more objects with known size, referred to herein as elevation reference objects. In order to extract an elevation of observed wind, the wind map generator 124 first associates elevation reference objects, such as people, objects (i.e., flag poles, trees, buildings/roofs, etc.), and the like with predetermined levels of elevation. For example, the wind map generator 124 may associate the elevation reference object of an adult male human with an elevation of an adult male human in that particular geographic region. Similarly, the wind map generator 124 may be configured to associate a height of stairs/floors of a building with a predetermined elevation, and associate those elevations to each recognizable stair/floor of a building.

After establishing one or more elevation reference objects in multimedia (step 208 continued), the wind map generator 124 then utilizes the predetermined size of the reference object in order to deduce an elevation of wind relative to the elevation reference object. This process comprises comparing the elevation reference object to an object from which wind is deduced, referred to herein as a wind reference object. For example, if the elevation reference object is a flag pole with known height and the wind reference object is a flag at the top of the flag pole, then the wind map generator 124 identifies the wind elevation as the same as the elevation reference object (flag pole) and the wind reference object (flag). Alternatively, if the wind map generator 124 determines that the flag is at half-staff, then the wind map generator 124 identifies the wind elevation and wind reference object relative (half) as that of the elevation reference object.

Similarly (step 208 continued), the wind map generator 124 may further process and extract a wind direction from the multimedia. In the example embodiment, the wind map generator 124 may deduce a wind direction using similar techniques to those above in identifying other contextual data. In order to extract a direction of observed wind, the wind map generator 124 first associates objects with known direction, referred to herein as directional reference objects, such as compasses, maps, roads/highways, landmarks, statues, buildings, the sun, etc., with predetermined directions. For example, the wind map generator 124 may associate an "avenue" in Manhattan with north and south directions and a "street" in Manhattan with east and west directions. Similarly, the wind map generator 124 may associate a sun appearing in the morning with the eastern direction, and the face of a building with the southern direction Like the extractions above, the wind map generator 124 may be further configured to cross-reference the extracted location, date/time, and/or elevation of the multimedia with an identified directional reference object. For example, if the geolocation of a photo indicates that it was taken on $42^{nd}$ street in NYC, the wind map generator 124 may reference a map database to determine that $42^{nd}$ street runs east and west. In addition, the wind map generator 124 may further cross reference the geolocation with objects identified within the photo, such as buildings, parks, restaurants, traffic, roads, etc. to establish which direction of $42^{nd}$ street is east/west.

Moreover (step 208 continued), in addition to geolocation, the wind map generator 124 may further consider a time of capture in determining wind direction. For example, if the photo includes the sun and was taken at 6:10 AM in NYC, then the wind map generator 124 may deduce that the sun must be depicted as easterly in the image. Furthering the example, if the photo was taken in January, when the sun pans more southerly from a perspective in the northern hemisphere, the wind map generator 124 may be additionally configured to associate the sun in a more southeast direction than it would during mid-summer when the sun rises more easterly. After establishing a directional reference within the multimedia, the wind map generator 124 may then determine a wind direction relative to the established, known direction(s). In other embodiments, for example those involving text and audio, the wind map generator 124 may transcribe and process the text using keyword searching techniques to identify terms indicative of direction, e.g., north, south, east, west, etc., and further apply natural language processing to filter out false positives, not unlike the methods used above.

When applicable (step 208 continued), the client device 110 may be configured to include additional metadata stamps within a multimedia, allowing for additional data extraction. For example, the client device 110 may utilize a built-in altimeter and/or barometer on capture and add elevation and/or pressure to metadata of captured multimedia. Such measurements may be used to further refine deduced wind speeds and may further be associated with particular wind scales within the wind scale reference database 122.

The wind map generator 124 analyses temporal and spatial features (step 210). Similar to the manner in which the present invention appreciates elevation as a factor in deducing wind speed, the wind map generator 124 additionally considers temporal and spatial features relevant to wind speed. In the example embodiment, temporal and spatial features refer to know and unknown terrain, sea, terrain-sea transition, and time based phenomena that relate to wind patterns. Such features include terrain and topographic wind (e.g., wind over crests of hills/ridges, escarpments, vegetation, etc.), building winds, city winds, heat island effects, lake effects, mountain waves, and the like. Such temporal and spatial features may be used to identify, validate, and further predict wind speeds within the generated wind speed map. For example, repeated observations of unusually high wind speeds between buildings in a city may be an indicator of an unknown pattern of building winds, or may verify an already-known pattern of building wind. Moreover, such patterns may be further considered for additional research or as a factor in deducing wind speed, and may even be used in predicting future winds.

The wind map generator 124 generates a wind map (step 212). In the example embodiment, the wind map generator 124 generates a wind map detailing a deduced wind speed at various locations at a given time. It will be appreciated that, depending on an amount of multimedia available, it may be impractical to display a deduced wind speed for each and every multimedia identified, particularly in highly populated areas. As such, it may be desirable to decrease (or increase) an amount of displayed wind speeds by consolidating (e.g., averaging) or otherwise modifying wind speeds for a specific location at a specific time. Such modification may be based on variables such as location, population, an amount of multimedia available, wind variability, application, demand, and the like. In addition to modifying the displayed wind speed based on location, the wind map generator 124 may further increase, decrease, or otherwise modify time frames in which wind speeds are observed and, in some embodiments, average deduced speeds over those time frames. Like the modification of wind speeds across a location, above, such time frame modification may be based on location, population, an amount of multimedia available, wind variability, application, demand, and the like.

Accordingly (step 212 continued), the generated wind map may vary in scope for a particular location at particular times. Alternatively, the generated wind map may be consolidated into a complete wind map for an entire region, however may incorporate interactive functions. For example, a zoomed out version of the map may display deduced speeds at a larger granularity that averages the wind speeds within a particular radius based on various metrics, for example a maximum amount of locations per prescribed area or an aspect ratio of locations to window size. In addition, zooming in on a particular area may increase location and wind granularity such that the wind speeds that were averaged while zoomed out are now broken down into discrete locations. Moreover, the interactive wind map may further include a duration slider which consolidates, for example via averaging, deduced wind speeds over a given time frame, for example the last five minutes or hour. In embodiments, the generated map may further include previously deduced and, in some embodiments, corrected wind speeds. Finally, the wind map may be further configured to predict future wind speeds at given locations based on previously identified patterns of the wind speed, for example based on location, time, and weather conditions.

The wind map generator 124 validates the wind scale reference database (step 214). In the example embodiment, the wind map generator 124 verifies that the wind speeds deduced from the multimedia are in fact accurate. In order to do this, the wind map generator 124 references highly-accurate wind measuring devices positioned at various weather stations in close spatial and temporal proximity to a location at which speed was deduced via multimedia. For example, if an image is captured within fifty feet of a school having a local weather station, the wind map generator 124 compares the wind speed deduced from the image to the measured wind speed sensed by the school weather station. Similarly, the wind map generator 124 may further reference radar and satellite imagery to compare measured wind speed to that deduced from multimedia in a close geographic proximity. In yet further embodiments, deduced wind speeds may be extrapolated between known weather stations by applying algorithms and determined wind patterns.

The wind map generator 124 refines the wind scale reference database 122 (step 216). In the example embodiment, the wind map generator 124 utilizes the previous validation step in order to modify the wind scale reference database 122 accordingly. In addition, the wind map generator 124 may further refine the keywords and target objects described by the wind scale reference database 122, as well as thresholds and identifying features associated with the wind scale reference database 122. For example, and with reference to FIG. 3, the wind map generator 124 may adjust the angle at which smoke need be detected as rising in order to be considered indicative of a wind scale of 1 rather than 0 ("smoke rises vertically"). Similarly, the wind map generator 124 may modify an amount of white foam that need be identified, for example through pixel analysis, in order to warrant a wind scale of 6.

In addition (step 216 continued), the wind map generator 124 may be configured to add, remove, and reassign keywords, target objects, etc., associated with each of the wind scales within the wind scale reference database 122. For example, if the keyword "strong breeze" is consistently used in multimedia to refer to a measured wind scale of 7, as opposed to a scale of 6 as indicted by the wind scale reference database 122, then the wind map generator 124 may reassign the keyword "strong breeze" to wind scale 7. The wind map generator 124 may be further configured to add observables to the wind scale reference database 122, such as keywords, expressions, idioms, and other phrases having not only syntactic matches to wind-based terminology but semantic matches as well. For example, if the wind map generator 124 identifies multimedia mentioning wind in the context of "raining sideways", then the wind map generator 124 cross references "raining sideways" to determine whether the phrase has semantic wind meaning. If the wind map generator 124 determines that a phrase, idiom, expression, etc. contains semantic wind meaning, in this case indicating that the wind is so strong it is fighting gravity, then the wind map generator 124 determines which scale to associate the phrase with in a similar manner to the validation step above. Specifically, the wind map generator 124 may associate the expression, phrase, etc., with one or more verified wind speeds within spatial and temporal proximity to the multimedia. In other embodiments, the wind map generator 124 may determine a wind scale with which to associate newly identified phrases based on other factors, including natural language processing, reference to additional databases, user input, and, among others, combinations of the above. The wind map generator 124 then adds the newly identified phrase to the wind scale reference database 122, thereby increasing observables by which to deduce speed while increasing performance and accuracy of the wind map generator 124.

FIG. 3 depicts the wind scale reference database 122 of FIG. 1 as a modified Beaufort Scale, in accordance with an embodiment of the present invention.

Figure 4:
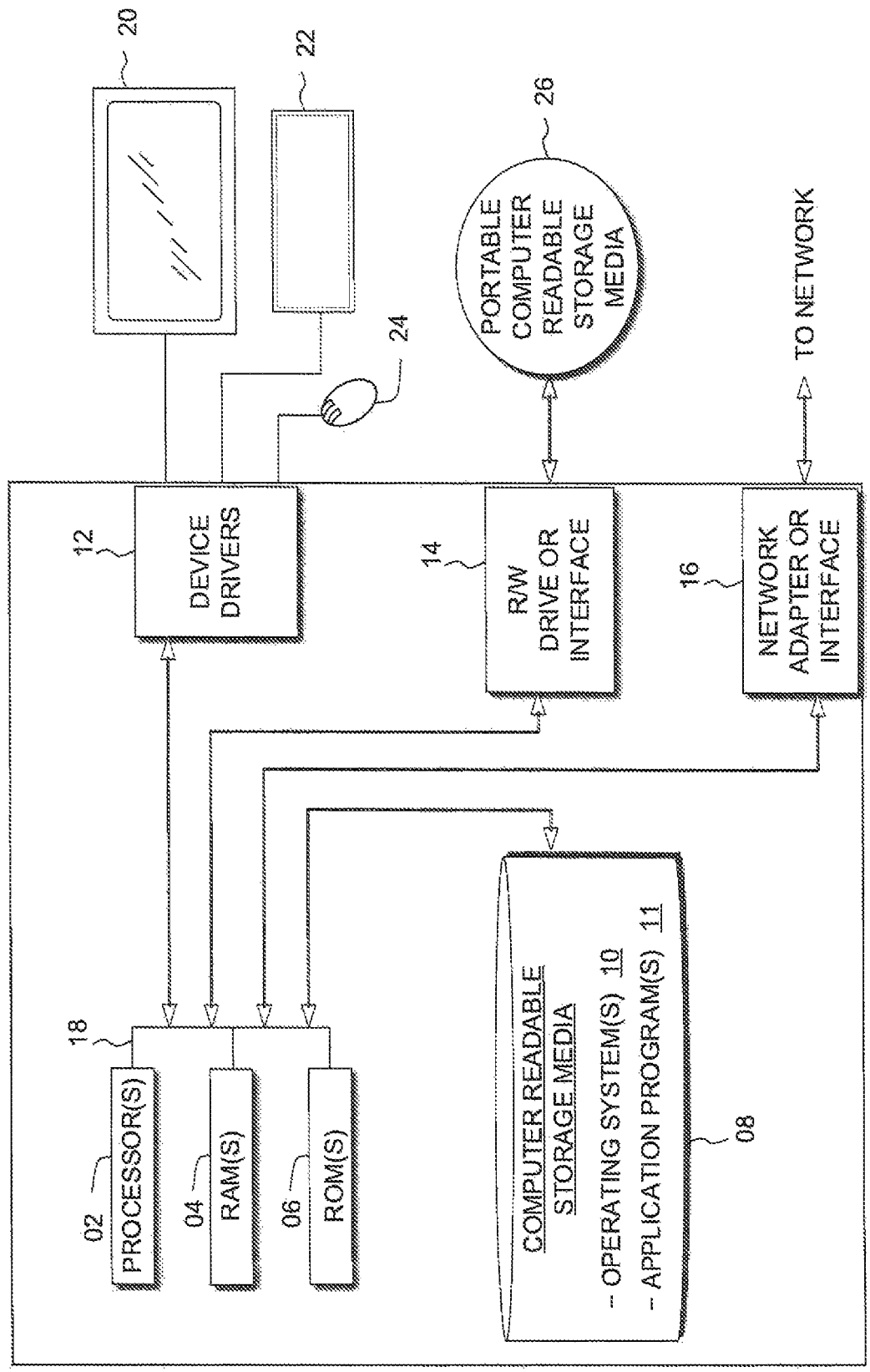
FIG. 4 illustrates a block diagram depicting the hardware components of the wind map generating system 100 of FIG. 1, in accordance with an example embodiment of the present invention.

FIG. 4 depicts a block diagram of client device 110 and server 120 of the wind map generating system 100 of FIG. 1, in accordance with an embodiment of the present invention. It should be appreciated that FIG. 4 provides only an illustration of one implementation and does not imply any limitations with regard to the environments in which different embodiments may be implemented. Many modifications to the depicted environment may be made.

Client device 110 may include one or more processors 02, one or more computer-readable RAMs 04, one or more computer-readable ROMs 06, one or more computer readable storage media 08, device drivers 12, read/write drive or interface 14, network adapter or interface 16, all interconnected over a communications fabric 18. Communications fabric 18 may be implemented with any architecture designed for passing data and/or control information between processors (such as microprocessors, communications and network processors, etc.), system memory, peripheral devices, and any other hardware components within a system.

One or more operating systems 10, and one or more application programs 11, for example interaction prediction program 142, are stored on one or more of the computer readable storage media 08 for execution by one or more of the processors 02 via one or more of the respective RAMs 04 (which typically include cache memory). In the illustrated embodiment, each of the computer readable storage media 08 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Client device 110 may also include a R/W drive or interface 14 to read from and write to one or more portable computer readable storage media 26. Application programs 11 on said devices may be stored on one or more of the portable computer readable storage media 26, read via the respective R/W drive or interface 14 and loaded into the respective computer readable storage media 08.

Client device 110 may also include a network adapter or interface 16, such as a TCP/IP adapter card or wireless communication adapter (such as a 4G wireless communication adapter using OFDMA technology). Application programs 11 on said computing devices may be downloaded to the computing device from an external computer or external storage device via a network (for example, the Internet, a local area network or other wide area network or wireless network) and network adapter or interface 16. From the network adapter or interface 16, the programs may be loaded onto computer readable storage media 08. The network may comprise copper wires, optical fibers, wireless transmission, routers, firewalls, switches, gateway computers and/or edge servers.

Client device 110 may also include a display screen 20, a keyboard or keypad 22, and a computer mouse or touchpad 24. Device drivers 12 interface to display screen 20 for imaging, to keyboard or keypad 22, to computer mouse or touchpad 24, and/or to display screen 20 for pressure sensing of alphanumeric character entry and user selections. The device drivers 12, R/W drive or interface 14 and network adapter or interface 16 may comprise hardware and software (stored on computer readable storage media 08 and/or ROM 06).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Based on the foregoing, a computer system, method, and computer program product have been disclosed. However, numerous modifications and substitutions can be made without deviating from the scope of the present invention. Therefore, the present invention has been disclosed by way of example and not limitation.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
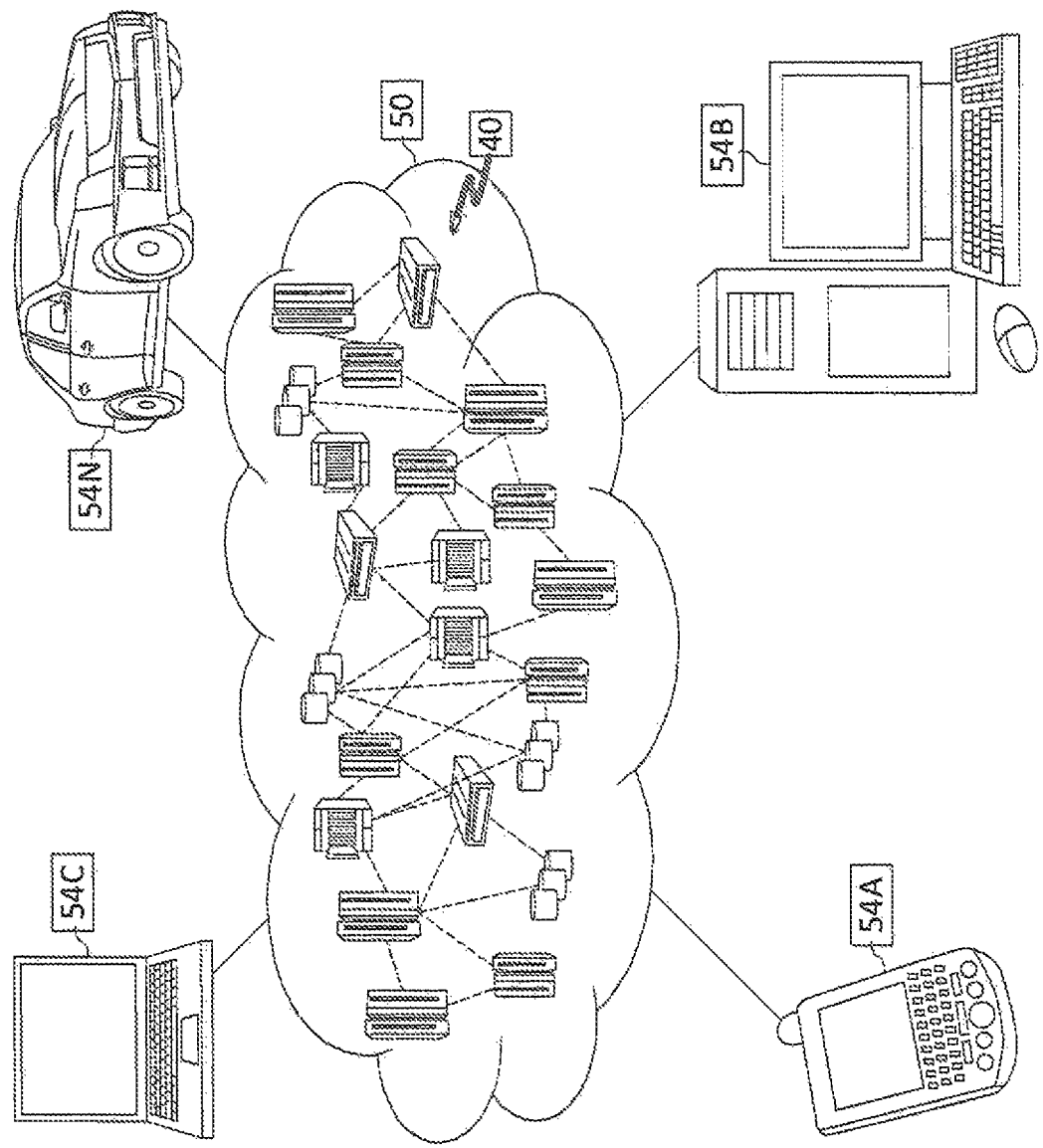
FIG. 5 depicts a cloud computing environment, in accordance with an embodiment of the present invention.

Referring now to FIG. 5, illustrative cloud computing environment 50 is depicted. As shown, cloud computing environment 50 includes one or more cloud computing nodes 40 with which local computing devices used by cloud consumers, such as, for example, personal digital assistant (PDA) or cellular telephone 54A, desktop computer 54B, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 40 and cloud computing environment 50 can communicate with any type of computerized device over any type of network and/or network addressable connection (e.g., using a web browser).

Figure 6:
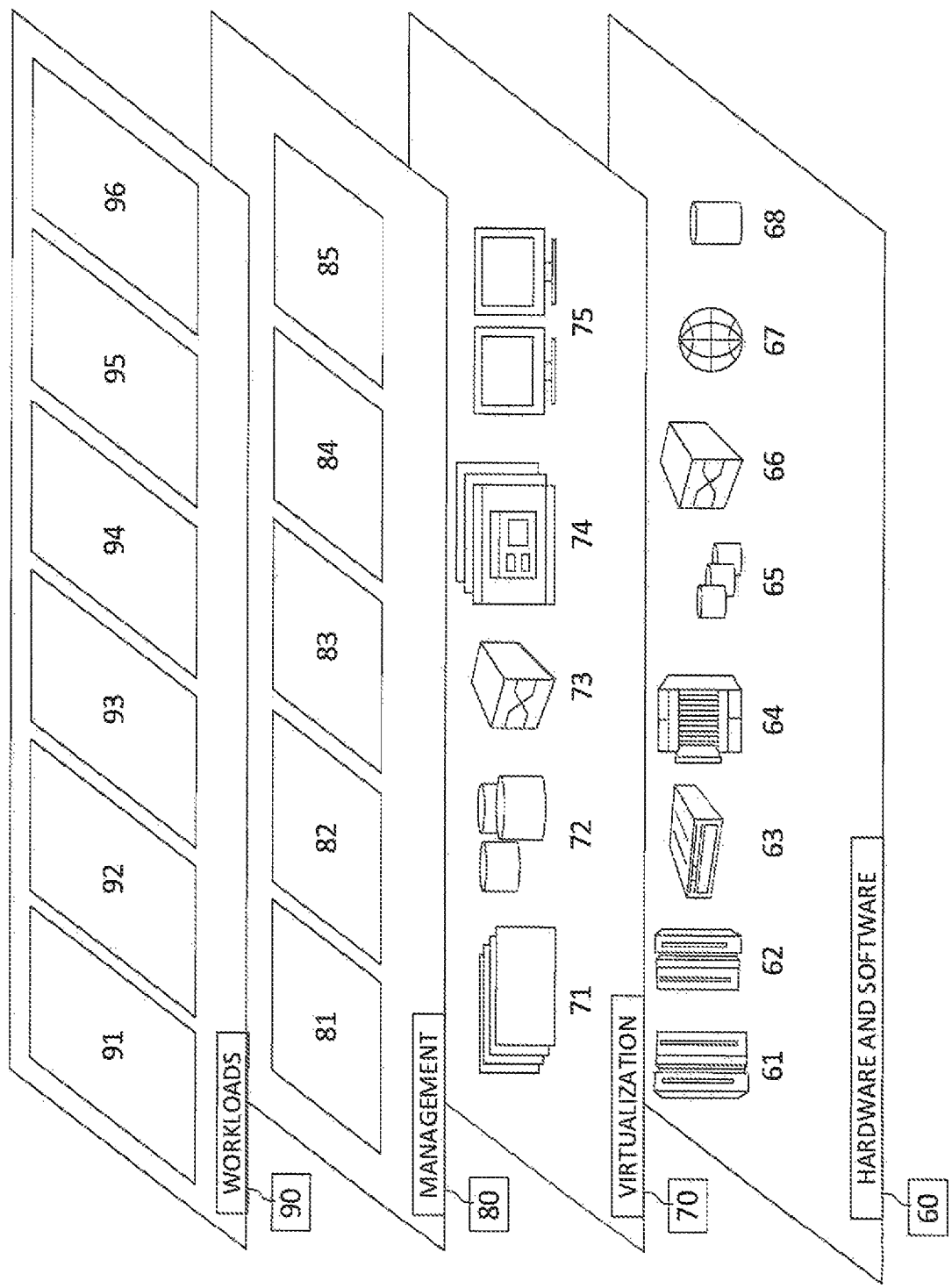
FIG. 6 depicts abstraction model layers, in accordance with an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and wind observation processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method for generating a wind map based on multimedia analysis, the method comprising:
    deducing a wind speed of wind identified in one or more multimedia based on a wind scale reference database, wherein the one or more multimedia includes at least one of text, audio, image, and video; and wherein extracting the contextual data corresponding to the one or more multimedia further comprises:
    transcribing the audio;
    applying keyword searching and natural language processing to the transcribed audio and the text; and
    applying image recognition technology to the image and the video;
    extracting contextual data corresponding to the one or more multimedia that includes a time, a date, and a GPS-determined geotag indicating a geolocation where the one or more multimedia was recorded;
    extracting temporal and spatial features from the multimedia, wherein the temporal and spatial features include terrain and topographic wind, building winds, city winds, heat island effects, lake effects, and mountain waves, wherein deducing the wind speed of the wind is further based on the extracted temporal and spatial features;
    generating a wind map that layers the deduced wind speed over a map;
    receiving user interaction with the wind map that modifies a zoom level and a time frame of the deduced wind speed;
    retrieving a verified wind speed from a weather station within a threshold spatial proximity of the extracted geolocation and a threshold temporal proximity to the time and the date;
    comparing the verified wind speed to the deduced wind speed; and
    modifying the wind scale reference database based on the comparison.

2. The computer-implemented method of claim 1, wherein extracting the contextual data corresponding to the one or more multimedia further comprises:
    extracting an elevation of the wind recorded in the one or more multimedia.

3. The computer-implemented method of claim 1, further comprising:
    removing false positive multimedia from the one or more multimedia by applying natural language processing to the extracted contextual data.

4. The computer-implemented method of claim 2, wherein extracting the contextual data corresponding to the one or more multimedia further comprises:
    extracting a wind direction from the one or more multimedia;
    extracting an atmospheric pressure from the one or more multimedia; and
    extracting a temperature from the one or more multimedia.

5. A computer program product for generating a wind map based on multimedia analysis, the computer program product comprising:
    one or more non-transitory computer-readable storage media and program instructions stored on the one or more non-transitory computer-readable storage media capable of performing a method, the method comprising:
    deducing a wind speed of wind identified in one or more multimedia based on a wind scale reference database, wherein the one or more multimedia includes at least one of text, audio, image, and video; and wherein extracting the contextual data corresponding to the one or more multimedia further comprises:
    transcribing the audio;
    applying keyword searching and natural language processing to the transcribed audio and the text; and
    applying image recognition technology to the image and the video;
    extracting contextual data corresponding to the one or more multimedia that includes a time, a date, and a GPS-determined geotag indicating a geolocation where the one or more multimedia was recorded;
    extracting temporal and spatial features from the multimedia, wherein the temporal and spatial features include terrain and topographic wind, building winds, city winds, heat island effects, lake effects, and mountain waves, wherein deducing the wind speed of the wind is further based on the extracted temporal and spatial features;

generating a wind map that layers the deduced wind speed over a map;

receiving user interaction with the wind map that modifies a zoom level and a time frame of the deduced wind speed;

retrieving a verified wind speed from a weather station within a threshold spatial proximity of the extracted geolocation and a threshold temporal proximity to the time and the date;

comparing the verified wind speed to the deduced wind speed; and modifying the wind scale reference database based on the comparison.

6. The computer program product of claim 5, wherein extracting the contextual data corresponding to the one or more multimedia further comprises:

extracting an elevation of the wind recorded in the one or more multimedia.

7. The computer program product of claim 5, further comprising:

removing false positive multimedia from the one or more multimedia by applying natural language processing to the extracted contextual data.

8. The computer program product of claim 6, wherein extracting the contextual data corresponding to the one or more multimedia further comprises:

extracting a wind direction from the one or more multimedia;

extracting an atmospheric pressure from the one or more multimedia; and extracting a temperature from the one or more multimedia.

9. A computer system for generating a wind map based on multimedia analysis, the computer system comprising:

one or more computer processors, one or more computer-readable storage media, and program instructions stored on one or more of the computer-readable storage media for execution by at least one of the one or more processors capable of performing a method, the method comprising:

deducing a wind speed of wind identified in one or more multimedia based on a wind scale reference database, wherein the one or more multimedia includes at least one of text, audio, image, and video; and wherein extracting the contextual data corresponding to the one or more multimedia further comprises:

transcribing the audio;

applying keyword searching and natural language processing to the transcribed audio and the text; and applying image recognition technology to the image and the video;

extracting contextual data corresponding to the one or more multimedia that includes a time, a date, and a GPS-determined geotag indicating a geolocation where the one or more multimedia was recorded;

extracting temporal and spatial features from the multimedia, wherein the temporal and spatial features include terrain and topographic wind, building winds, city winds, heat island effects, lake effects, and mountain waves, wherein deducing the wind speed of the wind is further based on the extracted temporal and spatial features;

generating a wind map that layers the deduced wind speed over a map;

receiving user interaction with the wind map that modifies a zoom level and a time frame of the deduced wind speed;

retrieving a verified wind speed from a weather station within a threshold spatial proximity of the extracted geolocation and a threshold temporal proximity to the time and the date;

comparing the verified wind speed to the deduced wind speed; and modifying the wind scale reference database based on the comparison.

10. The computer system of claim 9, wherein extracting the contextual data corresponding to the one or more multimedia further comprises:

extracting an elevation of the wind recorded in the one or more multimedia.

11. The computer system of claim 9, further comprising:

removing false positive multimedia from the one or more multimedia by applying natural language processing to the extracted contextual data.

\* \* \* \* \*